United States Patent [19]

Evers et al.

[11] 3,891,710

[45] June 24, 1975

[54] NOVEL 3-THIA ALKANE-1,4-DIONES

[75] Inventors: William J. Evers, Atlantic Highlands; Howard H. Heinsohn, Jr., Hazlet; Bernard J. Mayers, Cliffwood Beach, all of N.J.

[73] Assignee: International Flavors & Fragrances Inc., New York, N.Y.

[22] Filed: May 1, 1974

[21] Appl. No.: 466,066

Related U.S. Application Data

[62] Division of Ser. No. 386,454, Aug. 7, 1973, Pat. No. 3,836,563.

[52] U.S. Cl............ 260/593 R; 260/590; 260/601; 260/347.2; 426/221; 426/222
[51] Int. Cl.²......................................... C07C 49/04
[58] Field of Search....................... 260/593, 593 R

[56] References Cited
UNITED STATES PATENTS
3,773,524   11/1973   Katz et al............................ 260/593

Primary Examiner—Howard T. Mars
Assistant Examiner—James H. Reamer
Attorney, Agent, or Firm—Arthur L. Liberman, Esq.; Harold Haidt, Esq.

[57] ABSTRACT

Novel 3-thia-1,4-diones having the structure:

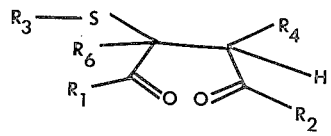

wherein $R_1$ and $R_2$ are the same or different and are either hydrogen or lower alkyl, $R_3$ is either hydrogen, lower alkyl, benzyl or phenyl and each of $R_4$ and $R_6$ are the same or different and are either hydrogen or lower alkyl, such 3-thia-1,4 alkane diones being useful in altering the organoleptic properties of foodstuffs.

3 Claims, No Drawings

NOVEL 3-THIA ALKANE-1,4-DIONES

This application is a division of applicants' copending parent application Ser. No. 386,454 filed on Aug. 7, 1973 now U.S. Pat. No. 3,836,563.

BACKGROUND OF THE INVENTION

The present invention relates to novel 3-thia-1,4 alkane diones.

Artificial flavoring agents for foodstuffs have received increasing attention in recent years. In many areas, such food flavoring agents are preferred over natural flavoring agents at least in part because of the uniform flavor that may be so obtained. For example, natural food flavoring agents such as extracts, essences, concentrates and the like are often subject to wide variation due to changes in the qualtiy, type and treatment of the raw materials. Such variation can be reflected in the end product and results in unreliable flavor characteristics and uncertainity as to consumer acceptance and cost. Additionally, the presence of the natural product in the ultimate food may be undesirable because of increased tendency to spoil. This is particularly troublesome in convenience and snack food usage where such products as dips, soups, chips, prepared dinners, canned foods, sauces, gravies and the like are apt to be stored by the consumer for some time prior to use.

The fundamental problem in preparing artificial flavoring agents is that of achieving as nearly as possible a true flavor reproduction. This generally proves to be a difficult task since the magnetism for flavor development in many foods is not understood. This is noteable in products having meaty and roasted flavor characteristics. It is also noteable in products having vegetable-like and hydrolyzed vegetable protein-like and anise-like flavor characteristics.

Reproduction of roasted and meat flavors and aromas and vegetable-like and hydrolyzed vegetable protein-like and anise-like flavor and aromas has been the subject of the long and continuing search by those engaged in the production of food stuffs.

The severe shortage of foods, especially protein foods, in many parts of the world has given rise to the need for utilizing non-meat sources of proteins and making such proteins as palatable and as meat-like as possible. Hence, materials which will closely simulate or exactly reproduce the flavor and aroma of roasted meat products and liver products and vegetable products are required.

Moreover, there are a great many meat containing or meat based boods presently distributed in a preserved form. Examples being condensed soups, drysoup mixes, dry meat, freeze-dried or lyophilized meats, packaged gravies and the like. While these products contain meat or meat extracts, the fragrance, taste and other organoleptic factors are very often impaired by the processing operation and it is desirable to supplement or enhance the flavors of these preserved foods with versatile materials which have either earlier roasted meat or gravy-like or vegetable-like or meat-like or ham-like nuances.

Belgian Pat. No. 786,192 issued Jan. 12, 1973 provided alpha-ketothiols and indicated that such alpha-ketothiols gave rise to savory meat flavors. An example of such an alpha-ketothiol is 2-mercapto pentanone-3.

South African Pat. No. 69/4539 dated June 26, 1969 discloses, for use as intermediates for subsequent reaction to form meat flavor compounds 1,4-dithioacetyl-2,3-diketones having the structure:

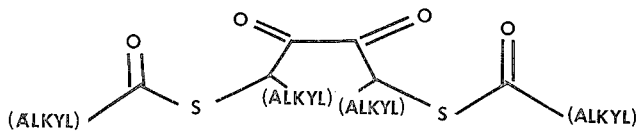

See page 6 of said South African Patent.

Nothing in the prior art, however, sets forth implicitly or explicity the 3-thia-1,4-alkane diones of our invention and their unique and advantageous and unobvious flavor properties.

THE INVENTION

The present invention provides novel 3-thia-1,4-alkane diones useful for altering the oroganoleptic properties of foodstuffs. Briefly, the novel compounds are 3-thia-1,4-alkane diones having the formula:

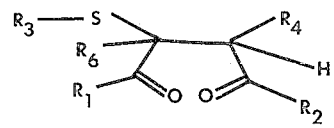

wherein $R_1$ and $R_2$ are the same or different and are either hydrogen or lower alkyl, $R_3$ is either hydrogen, lower alkyl, benzyl or phenyl and each of $R_4$ and $R_6$ are the same or different and are either hydrogen or lower alkyl.

Thus, 3-thia-1,4-alkane diones contemplated within the scope of our invention are:

3-Mercapto-2,5-hexanedione having the structure:

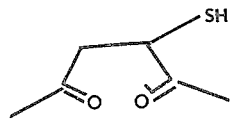

3-Thiopropyl-2,5-hexanedione having the structure:

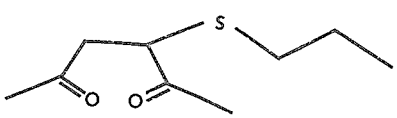

The novel compounds of our invention may be produced according to the processes which comprise the steps of:

i. providing a 2-ene-1,4 dione having the structure:

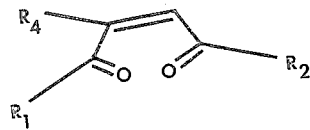

ii. intimately admixing said 2-ene-1,4 dione with a thiol or thio acid having the formula $R_3SH$ thereby providing a substituted or unsubstituted 2-thia substitured-1,4-dione having the structure:

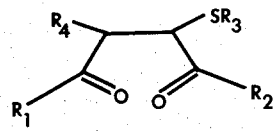

thereby providing a substituted or unsubstituted 2-thia alkane 1,4-dione having the structure:

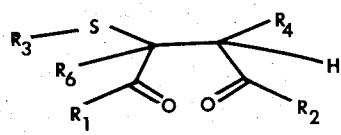

wherein $R_1$ and $R_2$ are the same or different and are either hydrogen or lower alkyl, $R_3$ is either hydrogen, lower alkyl, benzyl or phenyl and each of $R_4$ and $R_6$ are the same or different and are either hydrogen or lower alkyl.

The above-named 2-thia substituted 1,4 diones thus formed which are the compounds of our invention may be used as such as flavor additives or, when $R_6$ is hydrogen, may be used as chemical reaction intermediates and thus may be cyclized to form a substituted or unsubstituted 3-thia furan having the formula:

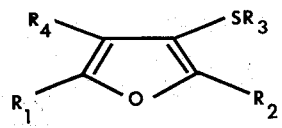

Such materials may, if desired, further be hydrolyzed to form 3-mercapto furan having the structure:

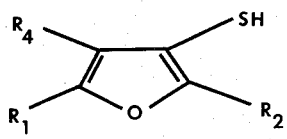

and these 3-mercapto furans may be further reacted with an acylating or aroylating agent thus forming a new acyl or aroyl 3-thia furan having the structure:

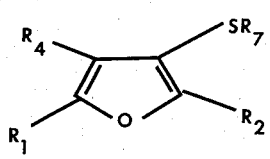

wherein $R_1$ and $R_2$ are the same or different and are either hydrogen or lower alkyl, $R_3$ is either hydrogen, lower alkyl, benzyl or phenyl, $R_4$ is the same or different and is either hydrogen or lower alkyl and $R_7$ is aroyl or acyl. $R_1$ or/and $R_2$ may each by hydrogen in the event that in step (ii) the 2-ene-1,4 dione is admixed with a thio acid or thiol having the formula $R_3SH$ in the presence of an organic base such as piperidine, pyridine, triethyl amine, quinoline or alpha-picoline or a mixture thereof.

The 2-ene-1,4 dione may be prepared by reacting 2,-5-dialkoxy-2,5-dialkyl-2,5-dihydro furan with a weak acid hydrolysis agent such as 1% aqueous acetic acid under reflux conditions. The resulting material will be in the case of starting with 2,5-dimethoxy-2,5-dihydrofuran, cis-3-hexen-2,5-dione.

The resulting 2-ene-1,4-dione is then reacted with either a thiol or a thio acid having the formula $R_3SH$. Examples of such thiols and thio acids are:

thioacetic acid
thiopropionic acid
thiobutyric acid
thioisobutyric acid
thio-n-pentenoic acid
methyl mercaptan
ethyl mercaptan
n-propyl mercaptan
isopropyl mercaptan
n-butyl mercaptan
isobutyl mercaptan
n-hexyl mercaptan
n-octyl mercaptan
n-nonyl mercaptan
benzyl mercaptan
thiophenol
p-tolyl mercaptan
m-tolyl mercaptan
o-tolyl mercaptan
thiocinnamic acid
thiobenzoic acid
2-methyl-thiobenzoic acid
3-methyl-thiobenzoic acid
4-methyl-thiobenzoic acid
2,4-dimethyl-thiobenzoic acid
3,5-dimethyl-thiobenzoic acid Whether an organic base is used or not in the reaction with the 2-ene-1,4 dione with the thiol or thio acid having the formula $R_3SH$, the 2-ene-1,4 dione can be exemplified as follows:

| Compound Name | $R_1$ | $R_2$ | $R_4$ |
|---|---|---|---|
| 3-Hexen-2,5-dione | Methyl | Methyl | Hydrogen |
| 3-Methyl-3-hexen-2,5-dione | Methyl | Methyl | Methyl |
| 3-Methyl-3-hepten-2,5-dione | Methyl | Ethyl | Methyl |
| 3-Ethyl-3-hepten-2,5-dione | Methyl | Ethyl | Ethyl |
| 4-Ethyl-4-octen-3,6-dione | Ethyl | Ethyl | Ethyl |
| 3-Propyl-3-hepten-2,5-dione | Methyl | Ethyl | Propyl |
| 4-Methyl-3-hepten-2,5-dione | Ethyl | Methyl | Methyl |
| 4-Methyl-4-octen-3,6-dione | Ethyl | Ethyl | Methyl |
| 4-Methyl-4-nonen-3,6-dione | Ethyl | Propyl | Methyl |
| 4-Propyl-3-hepten-3,6-dione | Ethyl | Methyl | Propyl |
| 5-Methyl-5-decene-4,7-dione | Propyl | Propyl | Methyl |
| 5-Methyl-4-nonen-3,6-dione | Propyl | Ethyl | Methyl |
| 4-Methyl-3-nonen-2,5-dione | Butyl | Methyl | Methyl |
| 4-Ethyl-3-nonen-2,5-dione | Butyl | Methyl | Ethyl |
| 3-Methyl-3-nonen-2,5-dione | Methyl | Butyl | Methyl |
| 3-Propyl-3-nonen-2,5-dione | Methyl | Butyl | Propyl |

-Continued

| Compound Name | $R_1$ | $R_2$ | $R_4$ |
|---|---|---|---|
| 3-butyl-3-hexen-2,5 dione | Methyl | Methyl | Butyl |
| 4-Octen-3,6-dione | Ethyl | Ethyl | Hydrogen |

As stated above, $R_1$ and $R_2$ can each be hydrogen for the purposes of these processes of our invention in the event that in the reaction of the 2-ene-1,4 dione with the thiol or thio acid of the formula $R_3SH$, an organic base is used. Hence, in addition to the foregoing compounds, the following compounds can be utilized in the reaction with $R_3SH$:

| Compound Name | $R_1$ | $R_2$ | $R_4$ |
|---|---|---|---|
| 2-buten-1,4 dial | Hydrogen | Hydrogen | Hydrogen |
| 2-Methyl-2-Buten-1,4 dial | Hydrogen | Hydrogen | Methyl |
| 2-Pentenal-4-one | Methyl | Hydrogen | Hydrogen |
| 2-Hexenal-4-one | Ethyl | Hydrogen | Hydrogen |
| 3-Methyl-2-Hexenal-4-one | Ethyl | Hydrogen | Methyl |
| 2-Methyl-2-pentenal-4-one | Hydrogen | Methyl | Hydrogen |
| 2-Methyl-2-heptenal-4-one | Hydrogen | Propyl | Methyl |
| 2-Methyl-2-octenal-4-one | Hydrogen | Butyl | Methyl |

Examples of useful organic bases are piperidine, pyridine, quinoline, triethyl amine and alpha-picoline. In place of such organic bases, radical initiators may be used such as benzoyl peroxide or azobisisobutyl nitrile. The reaction may be carried out in a solvent such as water or an ether such as diethyl ether or a hydrocarbon such as benzene or hexane or cyclohexane. The reaction may also be carried out without the use of a solvent. The reaction may be carried out under reflux conditions, although temperatures varying from 0° up to 60°C are suitable and will give rise to commercially suitable yields. When the reaction is carried out with highly volatile reactants, e.g., methyl mercaptan, higher pressures than atmospheric pressure are preferred, e.g., three atmospheres pressure. Examples of reaction products, 2-thia-substitured-1,4-diones which are formed from the reaction of the 2-ene-1,4-diones with the thio acids, and thiols having the formula $R_3SH$ are as follows:

| 2-ene-1,4 dione Reactant | $R_3SH$ Reactant | 3-Thia Substituted 1,4-dione reaction Product |
|---|---|---|
| 3-Hexen-2,5-dione | Thioacetic acid | 3-Thioacetyl-2,5-hexane-dione |
| 3-Methyl-3-hexen-2,5-dione | Thiopropionic acid | 3-Thiopropionyl-4-methyl hexane-2,5-dione |
| 3-Methyl-3-heptene-2,5-dione | Thiobenzoic acid | 4-Thiobenzoyl-4-methyl heptane-3,6-dione |
| 3-Ethyl-3-heptene-2,5-dione | Thiobenzoic acid | 4-Thiobenzoyl-5-ethyl heptane-3,6-dione |
| 4-Ethyl-4-octene-3,6-dione | Thioacetic acid | 4-Thioacetyl-5-ethyl-octane-3,6-dione |
| 3-Propyl-3-heptene-2,5-dione | Thiobutyryl acid | 4-Thiobutyryl-5-propyl-heptane-3,6-dione |
| 4-Methyl-3-heptene-2,5-dione 2-ene-1,4 dione Reactant | o-tolyl mercaptan $R_3SH$ Reactant | 3(o-tolylthio)-4-methyl heptane-3-Thia Substituted 1,4-dione reaction Product 2,5-dione |
| 2-Buten-1,4-dial | Thioacetic acid | 2-Thioacetyl-butane-1,4-dial |
| 2-Methyl-2-buten-1,4-dial | Thiobutyryl acid | 2-Thiobutyryl-3-methyl butane-1,4-dial |
| 2-Pentenal-4-one | 4-Methyl-thio benzoic acid | 2-Thiobenzoyl-pentanal-4-one |

In addition to being reaction sequence intermediates, the 2-thia-substituted-1,4-diones as exemplified above are also useful for altering the organoleptic properties of consumable materials, more particularly, foodstuffs. Thus, for example, 3-thioacetyl-2,5-hexanedione has a roasted meat aroma and a pot-roast and roasted meat flavor tested at levels of 5 ppm. Its flavor threshhold value is at 1 ppm. 3-Mercapto-2,5-hexane-dione has a roasted meat aroma and a roasted meat flavor at concentrations of 2 ppm with a threshhold value at 0.5 ppm. The compound 3-thiobenzoyl-2,5-hexanedione has a berry and a meat aroma and an allium, earthy and horseradish flavor at concentrations of approximately 0.5 ppm. Its threshhold value is at 0.5 ppm. 3-Thiobenzoyl-2,5-hexanedione at 5 ppm evaluated in beef bouillon has a meaty note. 3-Mercapto-2,5-hexanedione evaluated at 12.5 ppm adds a slight sulphury note (which indeed is desirable) to beef bouillon. 3-Thioacetyl-2,5-hexanedione at 5 ppm adds a burnt meat note to beef bouillon. 3-Thiobenzoyl-2,5-hexanedione adds a slightly green chicken meat note to chicken broth at 2.5 ppm. 3-Thioacetyl-2,5-hexanedione adds eggy chicken notes to chicken broth at 2.5 ppm. 3-Mercapto-2.5-hexanedione adds chicken sulphury notes to chicken broth at 2.5 ppm.

When used as intermediates, the thio-substituted-1,4-diones of our invention are then cyclized to form substituted or unsubstituted 3-thiafurans according to the following reaction:

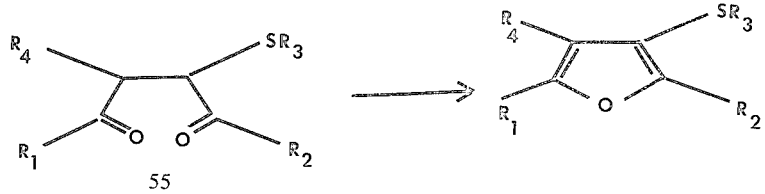

wherein $R_1$ and $R_2$ are the same or different and are each hydrogen or lower alkyl; wherein $R_3$ is either acyl or aroyl and $R_4$ is hydrogen or lower alkyl. The resulting 3-thiafurans (novel compounds) may be used as such for their organoleptic properties or they may be hydrolyzed and then reacylated or aroylated to form other acyl thia or aroyl thia substituted furans (other novel compounds) which have still other organoleptic properties useful for flavoring foodstuffs.

Thus, the 3-thia alkane-1,4-dione derivatives and mixtures thereof according to the present invention can be used to alter, vary, fortify, modify, enhance, or otherwise improve the organoleptic properties, including flavor and/or aroma, of a wide variety of materials which are ingested, consumed, or otherwise organoleptically sensed. The term "alter" in its various forms will be understood herein to mean the supplying or imparting a flavor character or note to an otherwise bland, relatively tasteless substance, or augmenting an existing flavor characteristic where the natural flavor is deficient in some regard, or supplementing the existing flavor or aroma impression to modify the organoleptic character. The materials which are so altered are generally referred to herein as consumable materials.

Such 3-thia alkane-1,4-dione derivatives are accordingly useful in flavoring compositions. Flavoring compositions are herein taken to mean those which contribute a part of the overall flavor impression by supplementing or fortifying a natural or artificial flavor in a material, as well as those which supply substantially all the flavor and/or aroma character to a consumable article.

The term "foodstuff" as used herein includes both solid and liquid ingestible materials for man or animals, which materials usually do, but need not, have nutritional value. Thus, foodstuffs includes meats, gravies, soups, convenience foods, malt and other alcoholic or non-alcoholic beverages, milk and dairy products, nut butters such as peanut butter and other spreads, seafoods including fish, crustaceans, mollusks and the like, candies, breakfast foods, baked goods, vegetables, cereals, soft drinks, snack foods, dog and cat foods, other veterinary products, and the like.

When the 3-thia alkane-1,4-dione derivatives according to this invention are used in a food flavoring composition, they can be combined with conventional flavoring materials or adjuvants. Such co-ingredients or flavoring adjuvants are well known in the art for such use and have been extensively described in the literature. Apart from the requirement that any such adjuvant material be ingestibly acceptable, and thus non-toxic or otherwise non-deleterious, conventional materials can be used and broadly include other flavor materials, vehicles, stabilizers, thickeners, surface active agents, conditioners, and flavor intensifiers.

Examples of preferred co-flavoring adjuvants are:
Methyl thiazole alcohol (4-methyl-5-betahydroxyethyl thiazole);
2-Methyl butanethiol;
4-Mercapto-2-butanone;
3-Mercapto-4-pentanone;
1-Mercapto-2-propanone;
Benzaldehyde;
Furfural;
Furfural alcohol;
2-Mercapto propionic acid;
2-Pentene;
Alkyl pyrazine;
Methyl pyrazine;
2-Ethyl-3-methyl pyrazine;
Tetramethyl pyrazine;
Polysulfides;
Dipropyl disulfide;
Methyl benzyl disulfide;
Alkyl thiophenes;
2-Butyl thiophene;
2,3-Dimethyl thiophene;
5-Methyl furfural;
Acetyl furan;
2,4-Decadienal;
Guiacol;
Phenyl acetaldehyde;
δ-Decalactone;
d-Limonene;
Acetoin;
Amyl acetate;
Maltol;
Ethyl butyrate;
Levulinic acid;
Piperonal;
Ethyl acetate;
n-Octanal;
n-Pentanal;
Hexanal;
Diacetyl;
Monosodium glutamate;
Sulfur-containing amino acids;
Cysteine;
Hydrolyzed vegetable protein;
Hydrolyzed fish protein; and
Tetramethyl pyrazine The 3-thia alkane-1,4-dione derivatives, or the compositions incorporating them, as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The 3-thia alkane-1,4-dione compounds according to this invention can be incorporated with the carriers by conventional means such as spray-drying, drum-drying, and the like. Such carriers can also include materials for coacervating the 3-thia-alkane,1,4-dione derivatives (and other flavoring ingredients, as present) to provide encapsulated products. When the carrier is an emulsion, the flavoring composition can also contain emulsifiers such as mono- and diglycerides of fatty acids and the like. With these carriers or vehicles, the desired physical form of the composition can be prepared.

The quantity of 3-thia alkane-1,4-dione derivatives or mixtures thereof utilized should be sufficient to impart the desired flavor characteristic to the product, but on the other hand, the use of an excessive amount of the derivative is not only wasteful and uneconomical, but in some instances too large a quantity may unbalance the flavor or other organoleptic properties of the product consumed. The quantity used will vary depending upon the ultimate foodstuffs; the amount and type of flavor initially present in the foodstuff; the further process or treatment steps to which the foodstuff will be subjected; regional and other preference factors; the type of storage, if any, to which the product will be subjected; and the preconsumption treatment, such as baking, frying, and so on, given to the product by the ultimate consumer. Accordingly, the terminology "effective amount" and "sufficient amount" is understood in the context of the present invention to be quantitatively adequate to alter the flavor of the foodstuff.

It is accordingly preferred that the ultimate compositions contain from about 0.02 parts per million (ppm) to about 250 ppm of 3-thia alkane-1,4-dione derivative or derivatives. More particularly, in food compositions it is desirable to use from about 0.05 ppm to 100 ppm for enhancing flavors and in certain preferred embodiments of the invention, from about 0.2 to 50 ppm of the derivatives are included to add positive flavors to the finished product. All parts, proportions, percentages, and ratios herein are by weight unless otherwise indicated.

The amount of 3-thia alkane-1,4-dione material or materials of our invention to be utilized in flavoring compositions can be varied over a wide range depending upon the particular quality to be added to the foodstuff. Thus, amounts of one or more derivatives according to the present invention of from about 2 ppm up to 80 or 90 percent of the total flavoring composition can be incorporated in such compositions. It is generally found to be desirable to include from about 10 ppm up to about 0.1 percent of the 3-thia alkane-1,4-dione derivatives in such compositions.

The following examples are given to illustrate embodiments of the invention as it is preferably preferred to practice it. It will be understood that these examples are illustrative and the invention is not to be considered as restricted thereto except as indicated in the appended claims.

EXAMPLE I (Preparation of Cis-3-hexene-2,5-dione)

In a 1000 ml round bottom flask fitted with condenser and magnetic stirrer are placed 200 g of 2,5-dimethoxy-2,5-dimethyl-2,5-dihydrofuran and 200 ml of a 1% aqueous acetic acid solution. The resulting solution is heated to reflux, refluxed for 2 minutes, cooled with an ice bath to 25°C and 625 ml of a 2% sodium bicarbonate solution is added. The solution is saturated by addition of 23 g of sodium chloride and extracted with methylene chloride (1 × 200 ml and 3 × 100 ml). After drying over sodium sulfate removal of the methylene chloride in vacuo gives 142 g of crude cis-3-hexene-2,5-dione which by GLC analysis is about 90% product having the structure:

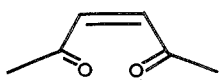

EXAMPLE II (Preparation of 3-Thioacetyl-2,5-hexanedione)

In a 1000 ml round bottom flask fitted with magnetic stirrer, thermometer, addition funnel and reflux condenser are placed 142 g of crude cis-3-hexene-2,5-dione (ex Example I), 380 ml of ether and 5 drops of piperidine. Thio acetic acid (96.6 g) is added over a period of one hour. When about one-eighth of the thio acetic acid is added the solution begins to reflux which continues during the remainder of the addition. After addition is complete, the mixture is allowed to stand for 85 minutes. Ether is then removed in vacuo (water aspirator) to give 235 g of crude material containing about 91% 3-thioacetyl-2,5-hexanedione. Distillation of a 134 g portion of the crude gives 84.5 g of 3-thioacetyl-2,5-hexanedione boiling at 86° to 87°C at 0.5 torr. NMR, IR and mass spectral analysis confirm the structure:

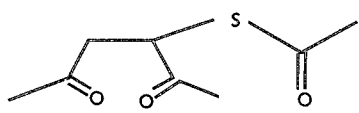

EXAMPLE III (Preparation of 3-Propylthio-2,5-hexanedione)

In a 500 ml flask fitted with thermometer, addition funnel, reflux condenser and magnetic stirrer are placed 95 ml of ether, 3-hexene-2,5-dione and one drop of piperidine. Addition of n-propanethiol is started and as the addition progresses more piperidine is added (33 drops total). After standing 18 hours, the solution is washed successively with 10% hydrochloric acid (2 × 7.5 ml), saturated sodium chloride solution (10 ml), 5% sodium bicarbonate solution and saturated sodium chloride solution (2 × 10 ml). The ether solution is dried over sodium sulfate and concentrated to give 51.4 g of a dark yellow oil. Analysis by GLC shows the material to be essentially pure 3-thiopropyl-2,5-hexanedione. Mass spectral analysis shows molecular ion 188 then descending order 43, 103, 41, 145, 71, 114 and 61 m/e units.

EXAMPLE IV (Preparation of 3-Mercapto-2,5-hexanedione)

To 150 ml of a 2% sodium hydroxide solution in a flask fitted for stirring is added 10 g of 3 thioacetyl-2,5-hexanedione. After stirring for one hour the pH of the mixture is adjusted to 5-6 by the addition of dilute (10%) hydrochloric acid, the solution is saturated with sodium chloride solution and extracted with ether (4 × 25 ml). The ether extracts are combined, washed with saturated sodium chloride solution (15 ml), dried and concentrated in vacuo to give 6.2 g of crude 3-mercapto-2,5-hexanedione boiling at 57°–59°C at 0.85 torr. NMR, IR and mass spectral analysis confirm the structure as 3-mercapto-2,5-hexanedione.

EXAMPLE V (Preparation of 2-Thioacetyl-1,4-butane-dial)

A. Preparation of 2-Butene-1,4-dial

A mixture of b 2,5-dimethoxy-2,5-dihydrofuran (20 g), water (80 ml) and acetic acid (3 drops) is stirred for 105 minutes at room temperature, 22 minutes at 40°C and 90 minutes between 60°C and 75°C. GLC analysis at this point indicates 15.7% starting material and 83.5% 2-butene-1,4-dial. The mixture is cooled to 25°C and sodium bicarbonate (0.3 g) is added.

B. Preparation of 3-Thioacetyl-1,4-butanedial

To the aqueous solution obtained in Section A, supra, is added 10 g of thiolacetic acid during a 14 minute period. During the addition, the temperature is kept below 30°C by intermittent application of a cooling bath. After 110 minutes, the reaction mixture is extracted with methylene chloride (3 × 35 ml). The combined methylene chloride extracts are dried and then concentrated in vacuo to give 17.8 g of yellow oil containing about 80% of 2-thioacetyl-1,4-butanedial. The compound is identified through mass spectral, NMR and IR analysis as having the structure:

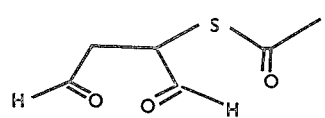

M.S. — No molecular ion; remaining peaks in decreasing intensity — 43, 29, 27, 45, 55, 60, 84, 100 and 142 m/e units.

NMR (CDCl$_3$) δ2.38 (s,3) 3.02 (multiplet 2 J=l0Hz)

4.46 ($t,l,J=$/OH), 9.40 ($s,l$) and 9.68 ($s,l$) ppm.
IR (thin film) — 2850, 2750, 1720, 1700 (shoulder), 1388, 1352, 1132 and 958 cm$^{-1}$

EXAMPLE VI (Preparation of 3-thioacetyl-4-oxo-pentanal)

A. 4-Oxo-2-Pentanal

Into a 5 liter, three-necked flask fitted with mechanical stirrer, thermometer and vacuum take-off are placed 600 g of 2-methyl-2,5-dimethoxy-2,5-dihydrofuran and 2,400 ml of deionized water. After 20 minutes of stirring at room temperature, the mixture becomes homogeneous and has a pale yellow green color. Analysis of a sample of the reaction mixture by GLC after 3.25 hours shows 22% methanol, 67% 4-oxo-2-pentanal and 9% starting material. Vacuum (26 torr.) is applied to the reaction mixture while maintaining the temperature of the reaction mixture between 25° and 30°C. After 3.25 hours GLC analysis shows 13% methanol, 82% 4-oxo-2-pentanal and 3.2% starting material. The vacuum is removed and the reaction mixture is allowed to stand at room temperature overnight. Analysis after standing overnight shows 12.9% methanol, 85% 4-oxo-2-pentanol and 2.1% starting material.

B. 3-Thioacetyl-4-oxo-pentanal

In a 5 liter, three-necked flask fitted with mechanical stirrer, thermometer and addition funnel are placed 2325 ml of the solution obtained in (A) and 2 ml of piperidine diluted in 5 ml of water. To this solution is added a mixture of thiolacetic acid 292.3 g) and piperidine (13 ml) over a 20 minute period. After standing an additional 10 minutes, 20 ml of concentrated hydrochloric acid is added, the resulting mixture poured into a separatory funnel and the oil layer removed. The aqueous layer is extracted with benzene (500 ml) and methylene chloride (2 × 500 ml). The benzene extract is combined with the oil layer and the mixture is dried over sodium sulfate. The methylene chloride extracts are combined and dried over sodium sulfate. Solvent removal in vacuo (40°–45° bath at 15 torr.) gives 414.5 g of crude oil from the benzene extract and 172.5 g of crude oil from the methylene chloride extracts.

EXAMPLE VII

The following formulation is prepared:

| Ingredient | Parts by Weight |
|---|---|
| Liquid hydrolyzed vegetable protein | 90.00 |
| 4-Methyl-5-beta-hydroxy-ethyl thiazole | 5.00 |
| Tetrahydro thiophene-3-one | 1.00 |
| Furfuryl mercaptan | 0.01 |
| 2-Nonenyl | 0.50 |
| Difurfuryl disulfide | 0.49 |
| Dimethyl sulfide | 0.50 |
| Methyl mercaptan | 0.50 |
| 3-Thioacetyl02,5-hexanedione | 2.00 |

The 3-thioacetyl-2,5-hexanedione imparts a roasted meat taste to the above formula and ties in and rounds up the other meat-like chemicals in the formula. When 3-thioacetyl-2,5-hexanedione is replaced by any one of the following compounds, a similar effect is imparted to the over-all flavor and aroma pattern of the above formula:

3-Mercapto-2,5-hexanedione
3-Thiobenzoyl-2,5-hexanedione

What is claimed is:

1. A compound having the structure:

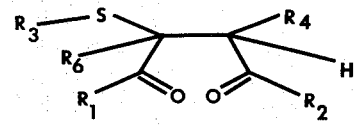

wherein $R_1$ and $R_2$ are each lower alkyl, $R_3$ is hydrogen, and each of $R_4$ and $R_6$ is lower alkyl or hydrogen.

2. The compound of claim 1 wherein each of $R_4$ and $R_6$ is hydrogen.

3. The compound of claim 2 wherein each of $R_1$ and $R_2$ is methyl.

* * * * *